United States Patent
Pan et al.

(10) Patent No.: US 12,002,206 B2
(45) Date of Patent: Jun. 4, 2024

(54) SYSTEM AND METHOD FOR AUTOMATICALLY IDENTIFYING MITOSIS IN H AND E STAINED BREAST CANCER PATHOLOGICAL IMAGES

(71) Applicant: GUILIN UNIVERSITY OF ELECTRONIC TECHNOLOGY

(72) Inventors: Xipeng Pan, Guilin (CN); Xinjun Bian, Guilin (CN); Yinghua Lu, Guilin (CN); Zhenbing Liu, Guilin (CN); Zujun Qin, Guilin (CN); Rushi Lan, Guilin (CN); Huihua Yang, Guilin (CN); Huadeng Wang, Guilin (CN); Lingqiao Li, Guilin (CN); Zimin Wang, Guilin (CN); Jijun Cheng, Guilin (CN); Zhizhen Wang, Guilin (CN); Zhengyun Feng, Guilin (CN); Shilong Song, Guilin (CN)

(73) Assignee: GUILIN UNIVERSITY OF ELECTRONIC TECHNOLOGY, Guilin (CN)

(*) Notice: Subject to any disclaimer, the term of this patent is extended or adjusted under 35 U.S.C. 154(b) by 0 days.

(21) Appl. No.: 18/332,302

(22) Filed: Jun. 9, 2023

(65) Prior Publication Data

US 2023/0401707 A1   Dec. 14, 2023

(30) Foreign Application Priority Data

Jun. 12, 2022   (CN) .......................... 202210659966.0

(51) Int. Cl.
*G06T 7/00*   (2017.01)
*G06T 7/10*   (2017.01)

(52) U.S. Cl.
CPC .............. *G06T 7/0012* (2013.01); *G06T 7/10* (2017.01); *G06T 2207/20081* (2013.01); *G06T 2207/20132* (2013.01); *G06T 2207/30068* (2013.01)

(58) Field of Classification Search
None
See application file for complete search history.

(56) References Cited

U.S. PATENT DOCUMENTS

| | | |
|---|---|---|
| 2019/0065817 A1 | 2/2019 | Mesmakhosroshahi |
| 2019/0206056 A1* | 7/2019 | Georgescu ............. G06V 10/82 |
| 2020/0388029 A1* | 12/2020 | Saltz .................... G06V 10/267 |

FOREIGN PATENT DOCUMENTS

| | | |
|---|---|---|
| CN | 108364288 A | 8/2018 |
| CN | 111723845 A | 9/2020 |

(Continued)

OTHER PUBLICATIONS

CN 112446881 machine English translation (Year: 2021).*

(Continued)

*Primary Examiner* — Nancy Bitar
(74) *Attorney, Agent, or Firm* — Stuart H. Mayer; Kaplan Breyer Schwarz LLP

(57) ABSTRACT

A system and a method for automatically identifying mitosis in H&E stained breast cancer pathological images are provided, belonging to the technical field of digital image processing, and including an input image preprocessing module: cutting an original picture according to a predetermined patch size, and performing a data enhancement by means of picture flipping, rotation, and the like; and a segmentation module: training a segmentation network by cutting patches in a training set, cutting data of a test set according to a corresponding size and sending to the segmentation network to obtain a patch-level segmentation result, and then reconstructing a segmented result into an (Continued)

image belonging to an original size according to patch coordinate information intercepted in a preprocessing stage of it.

2 Claims, 3 Drawing Sheets

(56) References Cited

FOREIGN PATENT DOCUMENTS

| CN | 112365440 | A | | 2/2021 |
|---|---|---|---|---|
| CN | 112446881 | | * | 3/2021 |
| CN | 112446881 | A | | 3/2021 |
| CN | 112862808 | | * | 3/2021 |
| CN | 112862808 | A | | 5/2021 |
| CN | 114387264 | A | | 4/2022 |
| CN | 114463336 | A | | 5/2022 |

OTHER PUBLICATIONS

CN 112862808 machine English translation (Year: 2021).*
Oktay, et al. "Attention U-Net: Learning Where to Look for the Pancreas" 1st Conference on Medical Imaging with Deep Learning (MIDL 2018), Amsterdam, The Netherlands.
Lu et al. "Breast cancer mitotic cell detection using cascade convolutional neural network with U-Net" MBE, 18(1): 673-695.
Ji et al. "Comparison of Fusion Methods for Multiple Neural Network Classifiers" 1008-1151(2011)09-0030-02.
Pan et al. "Mitosis detection techniques in H&E stained breast cancer pathological images: A comprehensive review" Computers and Electrical Engineering 91 (2021) 107038.
Ying, et al. "Mitosis Detection Algorithm in Pathological Image Based on Imp R Ove Deep Convolution Neural Network" Computer Applications and Software, vol. 35, No. 9, Sep. 2018.
Kausar, "Study on Breast Histopatholgy Image Analysis With Deep Learning Based Approaches" Dec. 2019, China Academic Journal Electronic Publishing house.

* cited by examiner

SYSTEM AND METHOD FOR AUTOMATICALLY IDENTIFYING MITOSIS IN H AND E STAINED BREAST CANCER PATHOLOGICAL IMAGES

CROSS-REFERENCE TO RELATED APPLICATIONS

This application claims priority to Chinese Patent Application No. 202210659966.0, filed on Jun. 12, 2022, the contents of which are hereby incorporated by reference.

TECHNICAL FIELD

The application belongs to a technical field of digital image processing, and in particular to a system for automatically identifying mitosis in H&E (hematoxylin-eosin) stained breast cancer pathological images, and a method of the system for automatically identifying mitosis in H&E stained breast cancer pathological images.

BACKGROUND

According to the latest cancer data released by the International Agency for Research on Cancer of the World Health Organization in 2020, the number of new breast cancer patients reached 2.26 million, with the highest incidence rate in the world, and breast cancer has become a major social public health problem. Especially in recent years, the number of female breast cancer patients in China continues to grow, and the age of patients tends to be smaller, which poses a great threat to women's health. Early diagnosis and treatment of the breast cancer may greatly improve the prognosis of patients.

Therefore, it is very important to make an accurate diagnosis of the breast cancer as soon as possible. At present, there are many ways to judge whether a patient has the breast cancer or not, but pathological diagnosis is unanimously regarded as the "golden standard" for tumor diagnosis. The most commonly used staining method for pathological diagnosis is H&E (hematoxylin-eosin) staining, and the stained histopathological image may directly show cell components and its tissue structure. The World Health Organization stipulates the Nottingham Scoring System as the criteria for grading the breast cancer, and classifies the breast cancer according to its severity. That is, the pathologist comprehensively considers three indexes of nuclear atypia, the formation of glandular ducts and the number of mitosis in the section, gives scores on the three indexes respectively, and finally comprehensively evaluates the severity of the tumor. Generally speaking, the lower the score, the lower the risk of tumor, where the number of mitosis is an extremely important index, which may evaluate the invasion of tumor cells and is an essential evaluation index. At the same time, the proliferation rate of tumor cells may be determined according to the number of mitosis, which is helpful for pathologists to determine the treatment and prognosis plan.

However, the existing algorithms is not capable of accurately segmenting and classifying the mitotic cells of the breast cancer with few sample cells and complex features.

SUMMARY

The purpose of the present application is to provide a system and a method for automatically identifying mitosis in H&E (hematoxylin-eosin) stained breast cancer pathological images, so as to solve the problems raised in the background.

To solve the problems above, a technical scheme is provided. A system for automatically identifying mitosis in H&E stained breast cancer pathological images includes:
- an input image preprocessing module used to cut an original picture according to a predetermined patch size, and perform a data enhancement by means of picture flipping, rotation, and the like;
- a segmentation module used to train a segmentation network by cutting patches in a training set, cut data of a test set according to a corresponding size and send to the segmentation network to obtain a patch-level segmentation result, and then reconstruct a segmented result into an image belonging to an original size according to patch coordinate information intercepted in a preprocessing stage of it; and
- a classification module used to respectively train three classification networks for a classification, fuse results of the three networks at a decision-making level, obtain a final output result by using a voting method, and then restore and mark the final result to obtain a final detection result.

In a further embodiment, the segmentation module includes:
- an attention segmentation network module used to train the segmentation network by cutting the patches in the training set, and cut the data of the test set according to the corresponding size and send them to the segmentation network to obtain the patch-level segmentation result; and
- a candidate cell selection method module used to reconstruct a segmented result into an image belonging to an original size according to patch coordinate information intercepted in a preprocessing stage of it.

In a further embodiment, the classification module includes:
- a three-branch classification network module used to train the three classification networks for the classification respectively;
- a decision-making fusion algorithm module used to fuse the results of the three networks at the decision-making level, and obtain the final output result by the voting method; and
- a classification result marking module used to restore and mark the final result to obtain the final detection result.

A method of the system automatically identifying mitosis in H&E stained breast cancer pathological images includes following specific steps:
- S1: a data preprocessing: cutting the data, wherein an edge length after cutting is 64 pixels, and because a size of an original HPF (high power field) is not capable of guaranteeing a complete cutting without overlapping, a way of filling first and then cutting is adopted; filling a corresponding size in the outer circle of an HPF edge when necessary. Before cutting, calculating a size c to be filled according to an edge length a of the original HPF and an edge length b of the patch after cutting. Copying long blocks with a length×a width of a×c in an edge area and filling into the edge area, and filling blocks of a small square area in a lower right corner, selecting a same size area of c×c in a lower right corner of the original HPF for copying. After above operations, obtaining an HPF image completely cut without overlapping, and then cutting all test sets in sequence from an upper left corner to obtain all patches for testing.

S2: a segmentation stage: constructing a segmentation network based on Attention U-Net, combining an attention mechanism to realize a weighted extraction of different features in spaces and channels, aiming at the morphological features of mitotic cells, improving a squeeze operation in SE (Squeeze-and-Excitation) module, and taking into account both texture information and background information. Based on above characteristics, the segmentation network SEAttUnet may realize a redistribution of attentions of space positions in different channels and feature maps, and improve a segmentation effect of a model;

obtaining a binary mask segmentation result with a patch as a unit after segmentation by the segmentation network. Restoring all patch-level pictures of the segmentation result to an HPF level according to previously recorded coordinate information, and filtering out some noise by performing operations of a connected domain screening and a corrosion expansion to obtain a segmentation binary image of the HPF level;

where outlines, positions and other information of all mitotic candidate cells in the HPF image obtained in the previous step are obtained, and center coordinates of the patch the candidate cells located are calculated according to the above information, and intercepting a corresponding patch in an original image as the candidate cells for the classification; and S3: a classification stage: training classification networks in the classification stage, respectively training the three classification networks for the classification, using VGG11, VGG19 and ResNet-50 for training respectively. Each of the networks outputs a test result respectively during testing, and prediction results of different classifiers in a same data set are not exactly same. A same patch to be classified is classified as class 0 under a judgment of a network 1, and possibly as class 1 when passing through a judgment of a network 2, so in a second stage of the classification, three different classification networks are used to synthesize all results for outputting. By assigning different weights to the prediction results of the each of the networks, the different classifiers are capable of learning different features. At a same time, in processes of repeated training and testing, the different classifiers have different judgments on a same cell, and the different weights are assigned according to classification precisions of different networks, to adjust contributions of the each of the networks when outputting a final classification result;

fusing classification results, that is, comprehensively considering categories output and classified already in the previous step at a result level, fusing the results of the three networks at the decision-making level in the classification module, and obtaining the final output result by using the voting method; and after passing the classification networks, enabling most of wrongly detected patches to be filtered out with remaining patches as the final result and restoring and marking the final result to obtain the final detection result.

The application has following technical effects and advantages: the system and the method for automatically identifying mitosis in H&E stained breast cancer pathological images provide a two-stage detection algorithm with cascade segmentation and classification. In methods of the two stages, a first-stage segmentation provides an effective cell candidate range for a second-stage classification, and the candidate cells are effectively screened by fusing a plurality of classifiers in the classification stage, so that the evaluation index of the detection result is continuously improved and the best effect is gradually achieved;

the system and the method for automatically identifying mitosis in H&E stained breast cancer pathological images are of great significance for accurately segmenting and classifying the mitotic cells of the breast cancer, especially those with few sample cells and complex features.

DETAILED DESCRIPTION

In following descriptions, numerous specific details are set forth in order to provide a more thorough understanding of the present application. However, it is apparent to those skilled in the art that the present application may be practiced without one or more of these details. In other embodiments, in order to avoid a confusion with the present application, some technical features well known in the art have not been described.

Figure 1:
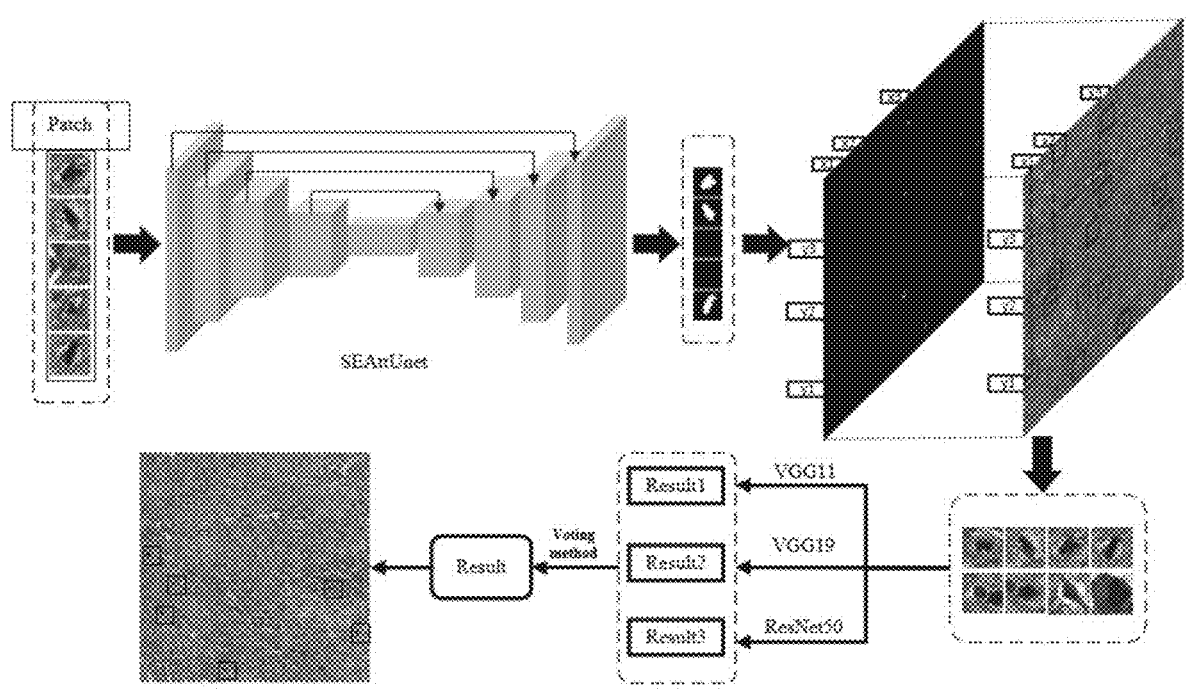
FIG. 1 is a flowchart of a two-stage detection method of the present application, and the flowchart is composed of following parts: inputting patches, a segmentation network, an attention mechanism, classifiers, a post-processing and outputting results.
Figure 2:
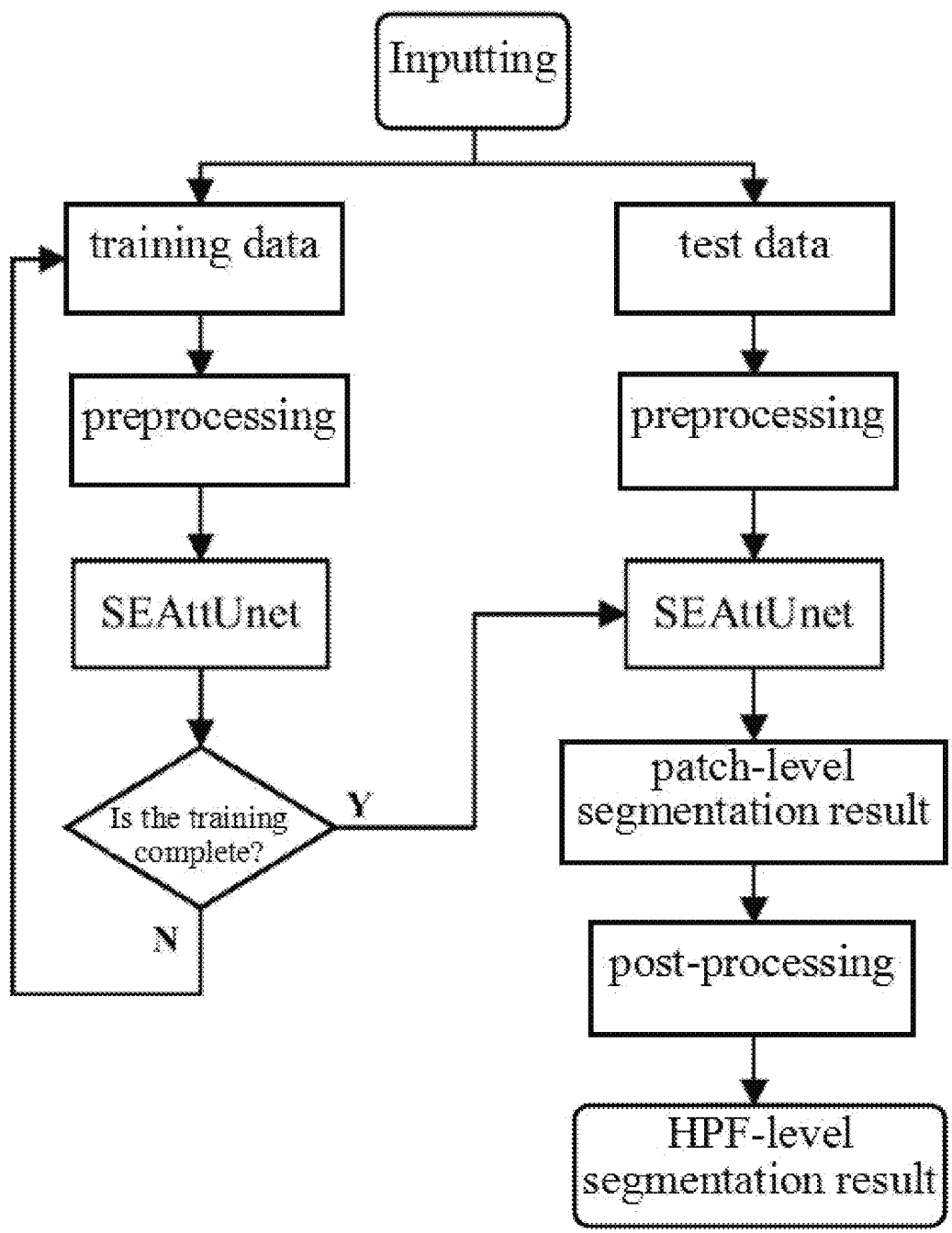
FIG. 2 is a flowchart of a segmentation algorithm of the present application, in which original patches are input and an HPF (high power field)-level segmentation results are output.
Figure 3:
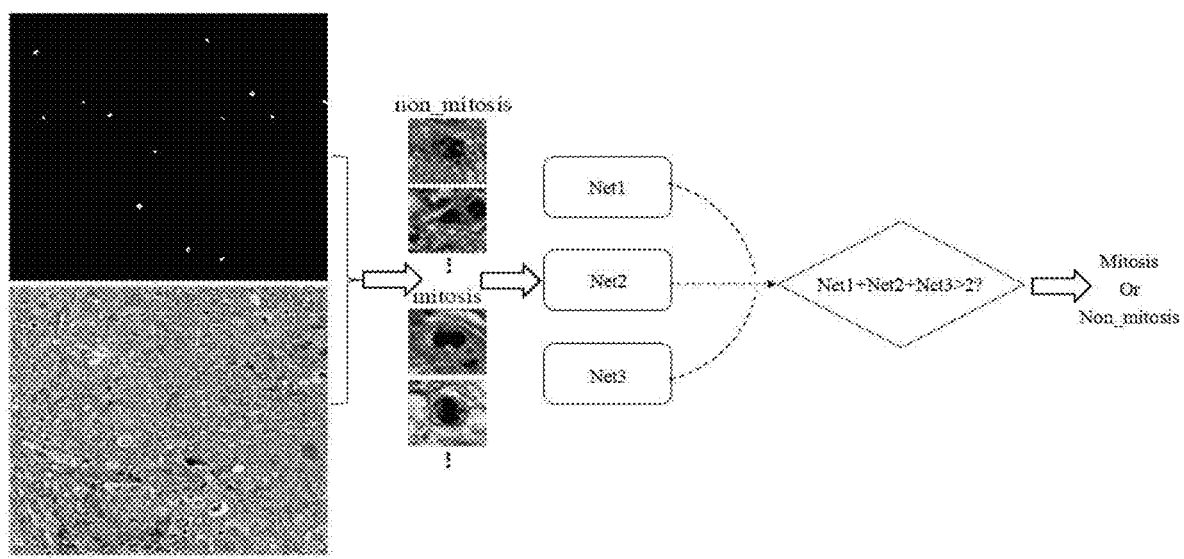
FIG. 3 is a classification flowchart of the present application.

In order to solve problems raised, the present application provides a system for automatically identifying mitosis in H&E (hematoxylin-eosin) stained breast cancer pathological images as shown in FIG. 1, FIG. 2, FIG. 3, including:

an input image preprocessing module used to cut an original picture according to a predetermined patch size, and perform a data enhancement by means of picture flipping, rotation, and the like; the data enhancement may effectively solve problems of unbalanced positive and negative samples or too few samples in the data;

a segmentation module: the segmentation module includes:

an attention segmentation network module used to train the segmentation network by cutting the patches in the training set, and cut the data of a test set according to the corresponding size and send them to the segmentation network to obtain the patch-level segmentation result; and a candidate cell selection method module used to reconstruct a segmented result into an image belonging to an original size according to patch coordinate information intercepted in a preprocessing stage of it;

a classification module: the segmentation module includes:

an attention segmentation network module used to train the segmentation network by cutting the patches in the training set, and cut the data of the test set according to the corresponding size and send them to the segmentation network to obtain the patch-level segmentation result; and a candidate cell selection method module used to reconstruct a segmented result into an image belonging to an original size according to patch coordinate information intercepted in a preprocessing stage of it;

the classification module includes:
a three-branch classification network module used to train the three classification networks for the classification respectively;

a decision-making fusion algorithm module used to fuse the results of the three networks at the decision-making level, and obtain the final output result by the voting method; and a classification result marking module used to restore and mark the final result to obtain the final detection result.

A method of the system automatically identifying mitosis in H&E stained breast cancer pathological images is characterized by including following specific steps:

S1: a data preprocessing: firstly, processing training data to obtain the training data of the segmentation network. A data set labeled at pixel level is used, a corresponding mask binary image is obtained through a pixel position labeling, and the corresponding RGB image is cut according to the mask to obtain the mitotic patches and non-mitotic patches as the training data, which are mainly realized in following ways:

1) obtaining the training data of the segmentation network: the data set labeled at the pixel level is used, the corresponding mask binary image is obtained through the pixel position labeling, and the corresponding RGB image is cut according to the mask to obtain the mitotic patches and non-mitotic patches as the training data;

2) test data processing: the test data is also cut into the same size as the training data. Because a size of an original HPF (high power field) is not capable of guaranteeing a complete cutting without overlapping, a way of filling first and then cutting is adopted; filling a corresponding size in the outer circle of HPF edge when necessary. Before cutting, calculating a size c to be filled according to an edge length a of the original HPF and an edge length b of the patch after cutting. Copying long blocks with a length×a width of a×c in an edge area and filling into the edge area, and filling blocks of a small square area in a lower right corner, selecting a same size area of c×c in a lower right corner of the original HPF for copying. After above operations, obtaining an HPF image completely cut without overlapping, and then sequentially cutting all test sets from an upper left corner to obtain all patches for testing.

S2: a segmentation stage: constructing a segmentation network based on Attention U-Net, combining an attention mechanism to realize a weighted extraction of different features in spaces and channels, improving a squeeze operation in SE (Squeeze-and-Excitation) module according to the morphological features of mitotic cells, taking into account both texture information and background information. Based on above characteristics, the segmentation network SEAttUnet may realize a redistribution of attentions of space positions in different channels and feature maps, and improve a segmentation effect of a model;

obtaining a binary mask segmentation result with a patch as a unit after segmentation by the segmentation network, which is mainly realized in following ways:

the attention mechanism: the SE module is an implementation of the attention mechanism, and it is a block that combines Squeeze and Excitation. In the training process, the features extracted through the network are distributed in different channels, and the SE module is an attention mechanism set at the channel level, implementing a process of allocating different weights to feature maps of the different channels. A matrix obtained after an operation of the Excitation is a channel feature weight matrix. Values in the matrix is multiplied with an original feature map U, that is, an attention distribution at the channel level is completed, and the operation is as follows:

$X'=X\otimes s$

In the formula, X'-- a feature map after passing through the SE module.

$\otimes$ channel multiplication

In the experiment, the SE module is inserted into a convolution operation of U-Net network, and redistributes a connection between each feature channel in processes of encoding and decoding;

a U-Net segmentation network combined with the attention mechanism is used, and the number of channels is increased by introducing the SE module. An overall network framework takes the U-Net as a basic framework, and an idea of the attention mechanism is added to a skip connection part. The attention module is realized by an attention gate. The segmentation network used realizes a redistribution of the attention to the position information in the feature in a segmentation process of the U-Net. On this basis, the SE module is introduced to realize a re-adjustment of the weights in the different channels. After the module is introduced, combining the function of attention gate in Attention_Unet, attentions may be redistributed in spatial positions of the different channels and the feature maps to improve a segmentation effect of a model;

the candidate cell selection method module is used for reconstructing a segmented result into an image belonging to an original size according to patch coordinate information intercepted in a preprocessing stage of it, which is mainly realized in following ways:

1) post-processing: after passing through the segmentation network, binary mask segmentation results with patch as the unit are obtained. First, restoring all patch-level pictures of the segmentation result to an HPF level according to previously recorded coordinate information, and filtering out some noise by performing operations of a connected domain screening and a corrosion expansion to obtain a final HPF-level segmentation result map;

2) outputting segmentation results: obtaining a segmentation binary image at the HPF level through cutting, prediction and reduction operations through cutting, predicting and restoring operations, an HPF-level segmentation binary image is obtained, from which outlines, positions and other information of all mitotic candidate cells may be obtained, thereby preparing for further classification;

S3: a classification stage: training classification networks in the classification stage, respectively training the three classification networks for the classification, using VGG11, VGG19 and ResNet-50 for training respectively. Each of the networks outputs a test result respectively during testing, and prediction results of different classifiers in a same data set are not exactly same. A same patch to be classified is classified as class 0 under a judgment of a network 1, and possibly as class 1 when passing through a judgment of a network 2, so in a second stage of the classification, three different classification networks are used to synthesize all results for outputting. By assigning different weights to the prediction results of the each of the networks, the different classifiers are capable of learning different features. At a same time, in processes of repeated training and testing, the different classifiers have different judgments on a same cell, and the different weights are assigned according to classification precisions of different networks, to adjust contributions of the each of the networks when outputting a final classification result;

fusing classification results, that is, comprehensively considering categories which output and classified already in the previous step at a result level, fusing the results of the three networks at the decision-making level in the classification module, and obtaining the final output result by using the voting method; and after passing the classification networks, enabling most of wrongly detected patches to be filtered out with remaining patches as the final result and restoring and marking the final result to obtain the final detection result.

Further, results of nuclear segmentation and classification of mitotic cytopathological images of breast cancer are finally obtained.

It should be noted that relational terms such as one and two are used herein solely to distinguish one entity or operation from another entity or operation and do not necessarily require or imply any such actual relationship or order between these entities or operations. Moreover, the terms "includes," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Without further restrictions. The mere fact that an element is recited by the statement "comprises a . . . "does not exclude the presence of other identical elements in a process, method, article, or apparatus that includes stated elements.

While embodiments of the present application have been shown and described, it will be understood by those of ordinary skill in the art that various changes, modifications, substitutions and alterations may be made to these embodiments without departing from the principles and spirit of the application, the scope of which is defined by the appended claims and their equivalents.

What is claimed is:

1. A system for automatically identifying mitosis in hematoxylin-eosin (H&E) stained breast cancer pathological images, comprising:
   an input image preprocessing module: cutting an original picture into a predetermined patch size, and performing a data enhancement through picture flipping and rotation;
   the original picture obtains a mask binary image through a pixel position labeling;
   obtaining training data of a segmentation network using a data set labeled at a pixel level, obtaining a corresponding mask binary image through the pixel position labeling, and cutting a corresponding RGB image based on the mask binary image to obtain mitotic patches and non-mitotic patches as the training data;
   a segmentation module: training the segmentation network by cutting mitotic patches and non-mitotic patches from a training set, cutting data of a test set according to a corresponding size and sending it to the segmentation network to obtain a patch-level segmentation result, and then reconstructing a segmented result into an image of the original size according to patch coordinate information intercepted in a preprocessing stage of it the segmentation module;
   a classification module: training three classification networks, performing a decision-making level fusion on results of the three classification networks, using a voting method to obtain a final output result, and then restoring and marking the final output result to obtain a final detection result;
   the segmentation module comprises an attention segmentation network module and a candidate cell selection method module;
   the classification module comprises a three-branch classification network module, a decision-making fusion algorithm module and a classification result marking module; and
   the attention segmentation network module introduces an SE (Squeeze-and-Excitation) module:
   constructing a segmentation network based on Attention U-Net, combining an attention mechanism to realize a weighted extraction of different features in spaces and channels, aiming at morphological features of research objectives mitotic cells, improving a squeeze operation in the SE module, and taking into account both texture information and background information; and based on above characteristics, enabling the segmentation network SEAttUnet based on the Attention U-Net to realize a redistribution of attentions of space positions in different channels and feature maps.

2. A method of the system for automatically identifying mitosis in H&E stained breast cancer pathological images according to claim 1, comprising following specific steps:
   S1: data preprocessing: performing a cutting operation on the training data, wherein an edge length after cutting is 64, and a size of an original high power field (HPF) is not capable of guaranteeing a complete cutting without overlapping, a way of filling first and then cutting is adopted; filling a corresponding size in an outer circle of an HPF edge; before cutting, according to an edge length a of the original HPF and an edge length b of the patch after cutting, calculating a size c to be filled, copying long blocks with a length× a width of a× c in an edge area and filling into the edge area, and filling blocks of a small square area in a lower right corner, selecting a same size area of c×c in a lower right corner of the original HPF for copying; after above operations, obtaining an HPF image completely cut without overlapping, and then cutting all test sets in sequence from an upper left corner to obtain all patches for testing;
   S2: a segmentation stage:
   through the segmentation network, obtaining a binary mask segmentation result with a patch as a unit after segmentation; restoring all patch-level pictures of a segmentation result to an HPF level according to previously recorded coordinate information, then through operations of connected domain screening and corrosion expansion, filtering out some noise, and obtaining a segmentation binary image of the HPF level;
   in the HPF image obtained in a previous step, outline and position information of all mitotic candidate cells is capable to be obtained, using the obtained information of the mitotic candidate cells, center coordinates of the patch are calculated, and a corresponding patch is intercepted in an original image as the candidate cells for the classification; and
   S3: a classification stage: training the three classification networks for the classification, using VGG11, VGG19 and ResNet-50 for training respectively; during testing, each of the networks outputs a test result respectively, and prediction results of different classifiers in the same data set are not exactly same; the same patch to be classified as class 0 based on the judgment of a network 1, and potentially as class 1 when assessed by network 2 in a second stage of the classification, three different classification networks are used to synthesize all results for outputting; by assigning different weights to prediction results of each of the networks, different classifiers are capable of learning different features; at a same time, in processes of repeated training and testing, the different classifiers have different judgments on a same cell, according to classification precisions of different networks, the different weights are assigned to adjust contributions of the each of the networks when outputting a final classification result;

fusing classification results, that is, comprehensively considering categories output and classified already in the previous step at a result level, fusing the results of the three networks at the decision-making level in the classification module, and using the voting method to obtain the final output result; and after passing the classification networks, enabling most of wrongly detected patches to be filtered out with remaining patches as the final result; and restoring and marking the final result to obtain the final detection result.

* * * * *